United States Patent
Nett et al.

(10) Patent No.: US 7,553,251 B2
(45) Date of Patent: Jun. 30, 2009

(54) POWER DIVIDER

(75) Inventors: Hans-Peter Nett, Adenau (DE); Michael Hoeck, Neunkirchen-Seelscheid (DE); Jan Haupt, Cologne (DE)

(73) Assignee: GETRAG Driveline Systems GmbH, Cologne (DE)

( * ) Notice: Subject to any disclaimer, the term of this patent is extended or adjusted under 35 U.S.C. 154(b) by 427 days.

(21) Appl. No.: 11/529,744

(22) Filed: Sep. 28, 2006

(65) Prior Publication Data

US 2007/0155577 A1   Jul. 5, 2007

Related U.S. Application Data

(63) Continuation of application No. PCT/EP2005/003000, filed on Mar. 22, 2005.

(30) Foreign Application Priority Data

Mar. 30, 2004   (DE) .................. 10 2004 016 642

(51) Int. Cl.
*F16H 48/06*   (2006.01)
(52) U.S. Cl. ...................................... 475/221
(58) Field of Classification Search ................ 180/248, 180/249
See application file for complete search history.

(56) References Cited

U.S. PATENT DOCUMENTS

| 4,862,769 A | 9/1989 | Koga et al. |
| 4,912,639 A | 3/1990 | Kawamoto et al. |
| 5,167,293 A | 12/1992 | Park et al. |
| 5,234,072 A * | 8/1993 | Chludek ............... 180/248 |
| 5,484,033 A | 1/1996 | Frank et al. |
| 5,547,430 A * | 8/1996 | Gasch ................. 475/89 |
| 2004/0053725 A1 | 3/2004 | Pecnik |

FOREIGN PATENT DOCUMENTS

| DE | 37 21 628 A1 | 1/1988 |
| DE | 38 02 368 C2 | 8/1988 |
| DE | 40 21 747 C2 | 7/1990 |
| DE | 41 22 126 C2 | 1/1993 |
| EP | 1 205 336 A2 | 5/2002 |
| WO | WO 02/28678 A | 4/2002 |

OTHER PUBLICATIONS

"Fahrzeuggetriebe—Grundlagan, Auswahl, Auslegung und Konstruction", G. Lechner, H. Naunheimer. Springer Verlag, 1994, pp. 116-120 (with concise statement of relevance in English).
International Preliminary Report on Patentability on PCT Application PCT/EP2005/003000, Nov. 9, 2006.

\* cited by examiner

*Primary Examiner*—Dirk Wright
(74) *Attorney, Agent, or Firm*—Knobbe, Martens, Olson & Bear LLP

(57) ABSTRACT

A power divider for a motor vehicle with a first and a second driven axle, with an input member which is connectable to the output of a drive unit, with a transverse differential for the first driven axle and an output member which is connectable to the second driven axle, and with a friction clutch which has two friction members, one of the friction members being connected to the output member, the other friction member being connected axially rigidly to an input element of the transverse differential, and the input element of the transverse differential being supported in the axial direction on the output member.

21 Claims, 4 Drawing Sheets

POWER DIVIDER

CROSS-REFERENCE TO RELATED APPLICATIONS

This application is a Continuation application of International application PCT/EP2005/003000 that claims priority of German patent application DE 10 2004 016 642.0.

BACKGROUND OF THE INVENTION

The present invention relates to a power divider (transfer case) for a motor vehicle with a first and a second driven axle. Motor vehicles of this type (four-wheel drive vehicles) have assumed great importance in recent years.

What is especially important in four-wheel drive vehicles is the power divider which controls the power flux between the first and the second driven axle.

An input member of the power divider is in this case connectable to the output of a drive unit.

Such a drive unit of a motor vehicle has at least one engine. The engine may be an internal combustion engine, an electric motor, a hybrid motor or the like. The output of the engine is connected, as a rule, to a transmission. The transmission may be a multi-step transmission, such as a manual shift transmission, an automatic converter transmission, a double clutch transmission or else a continuously variable transmission, such as a CVT, toroidal transmission or the like.

The drive unit may be designed as a front drive unit or as a rear drive unit.

The power divider is installed, as a rule, in direct spatial assignment to the drive unit, that is to say, in the case of a front drive unit, in the region of the front axle and, in the case of a rear drive unit, in the region of the rear axle. In this case, for example, the power divider may also be integrated into a casing of the preceding transmission.

Where power dividers are concerned, a distinction is generally made between differential-controlled systems, clutch-controlled systems and mixed forms of these two systems.

Where differential-controlled systems are concerned, torque distribution to the two driven axles takes place by means of a longitudinal differential. This may be a bevel wheel differential or a planet wheel differential. In this case, generally, a specific ratio of torque distribution is predetermined, for example 50% front axle, 50% rear axle.

In clutch-control systems, only one axle is driven permanently. The second axle is cut in manually or automatically, as required.

Furthermore, in differential-control systems, it is possible to lock the differential completely or in a regulated manner, for example by means of a parallel-connected dog clutch or by means of a parallel-connected regulatable friction clutch.

DE 37 21 628 C2 discloses a power divider in which a longitudinal and a transverse differential are arranged coaxially with respect to the front axle of the motor vehicle. The transverse differential is arranged adjacently to a toothed ring which is in engagement with a driven gearwheel of a preceding multi-step transmission. The toothed ring is connected to the longitudinal differential via an outer hollow shaft. One output of the longitudinal differential is connected to an adjacent crown wheel which is in engagement with a cardan shaft for driving the rear wheels. The second output of the longitudinal differential is connected via an inner hollow shaft to the input of the transverse differential. A longitudinal lock in the form of a lamellar clutch is provided between the input of the transverse differential and a portion of the toothed ring.

Furthermore, an axle drive block with a differential lock is known from WO 02/28678 A1. Two planet wheel sets for forming a longitudinal and a transverse differential are coupled via a common ring wheel. The outer circumference of the latter comes into locking engagement with the inner circumference of the differential casing.

BRIEF SUMMARY OF THE INVENTION

Against the above background, the object of the present invention is to specify an improved power divider for a motor vehicle.

This object is achieved, according to a first aspect of the present invention, by means of a power divider for a motor vehicle with a first and a second driven axle, with an input member which is connectable to the output of a drive unit, with a transverse differential for the first driven axle and an output member which is connectable to the second driven axle, and with a friction clutch which has two friction members, one of the friction members being connected to the output member, the other friction member being connected axially rigidly to the input element of the transverse differential, and the input element of the transverse differential being supported in the axial direction on the output member.

By virtue of the measure of connecting one friction member of the friction clutch axially rigidly to the input element of the transverse differential, the reaction forces when the friction clutch is acted upon are introduced in the axial direction into the input element of the transverse differential.

In order to support these axial forces, the input element of the transverse differential (as a rule, the differential cage in the case of a bevel wheel differential) is mounted axially on the output member or is supported on the latter.

This is possible in a comparatively simple way, in particular, when the output member surrounds the input element of the transverse differential on one or on both axial sides, as is the case, for example, when the friction clutch and the input member are arranged on opposite sides of the transverse differential.

Since the friction clutch no longer has to be supported on the casing, moreover, space is provided for a modular extension of the power divider.

According to a second aspect of the present invention, the above object is achieved by means of a modular power divider for a motor vehicle with a first and a second driven axle, with an input member which is connectable to the output of a drive unit, with a transverse differential for the first driven axle and an output member which is connectable to the second driven axle, and with a friction clutch which has two friction members, one of the friction members being connected to the output member, the other friction member being connected to one input element of the transverse differential, and, furthermore, a space for a longitudinal differential being provided coaxially with respect to the first driven axle, so that, alternatively, a longitudinal differential can be installed, the input element of which is connected to the input member and which is connected on the output side to the input element of the transverse differential and to the output member, the friction clutch serving as a longitudinal lock, or the input member is connected to the input element of the transverse differential by means of a connecting member bridging the longitudinal differential space, the friction clutch serving for cutting in the second driven axle.

The modular power divider according to the second aspect of the present invention thus makes it possible to implement different concepts of torque distribution on the principle of a standard basic construction. Either this basic construction is designed for a clutch-controlled torque distribution, to be precise when no longitudinal differential is installed and the friction clutch serves for cutting in the second driven axle (hang-on solution), or a longitudinal differential is installed in the space provided, so that torque distribution to the front and the rear axle in a fixed ratio is obtained.

The term "friction clutch" is to be understood in the present context as meaning both passive and active (regulatable) friction clutches. Passive friction clutches may be, for example, fluid friction clutches, such as visco-clutches or clutches with surface friction. In the present context, therefore, even a torque sense differential is to be considered as a friction clutch.

Preferably, the friction clutch according to the invention is an active (regulatable) friction clutch, such as, for example, a dry friction clutch. The friction clutch is particularly preferably a wet lamellar clutch. Active friction clutches are preferred particularly on account of better ABS compatibility.

The object is therefore achieved in full.

It is particularly advantageous if a second friction clutch is provided which serves as a transverse lock.

By a second friction clutch being used, a locking action can be achieved. In the case of a regulatable friction clutch as a transverse lock, the adverse influences on the characteristic steering behavior can be avoided, such as occur in the case of passive transverse locks. This applies particularly when the axle kinematics of the assigned driven axle are coordinated with such an active transverse lock (for example, a shorter interference force lever arm). Overall, a substantially better driving behavior is achieved, as compared with an open transverse differential. Traction in the case of extreme differences in coefficients of friction between right and left (I-split) is increased considerably. Transverse dynamics can be influenced positively in that load change oversteering and power understeering which occur can be compensated.

It is particularly advantageous in this case if one friction member of the second friction clutch is connected to the input element of the transverse differential, and if another friction member of the second friction clutch is connected to one of the two output elements of the transverse differential, that is to say to one of the two drive shafts of the first driven axle.

By virtue of this measure, a transverse lock can be implemented comparatively simply.

It is particularly preferred, furthermore, if the first and the second friction clutch share a web (carrier) on which a friction member of the first friction clutch and a friction member of the second friction clutch are mounted.

In this construction, the first and the second friction clutch can be implemented so as to be particularly short in the axial direction.

Since, in the first aspect of the present invention, the first friction clutch does not have to be supported on the casing, an axial extension around the second friction clutch can be implemented comparatively simply in structural terms.

In this case, it is particularly advantageous if the friction members mounted on the web are mounted on opposite axial ends of the web.

Although a mounting of the friction members on one axial side of the web may be envisaged, the opposite arrangement is preferred for reasons of a compact radial form of construction.

According to a further embodiment, preferred overall, the first friction clutch or the first and the second friction clutch are arranged at one axial end of the power divider.

It is thereby possible, furthermore, to provide the transverse lock as a further module of the modular power divider in a simple way in structural terms or, alternatively, even not to provide said transverse lock.

Overall, it is likewise preferred if a casing of the power divider forms an axial cover which receives the first friction clutch and, if appropriate, the second friction clutch.

This form results in a simple mounting of the power divider.

In this case, it is particularly advantageous if an actuating member for actuating the second friction clutch is integrated in the axial cover.

In the event that the second friction clutch is provided as a transverse lock in the power divider, the actuating member can thus be implemented in a simple way.

It is particularly advantageous if the transverse differential and the longitudinal differential, provided if appropriate, are bevel wheel differentials.

It would be appreciated, however, that the differentials may also be designed as planet wheel differentials.

One or both of the differentials may also be designed as passive locking differentials, for example as torque sense differentials.

It would be appreciated that the features mentioned above and those yet to be explained below may be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
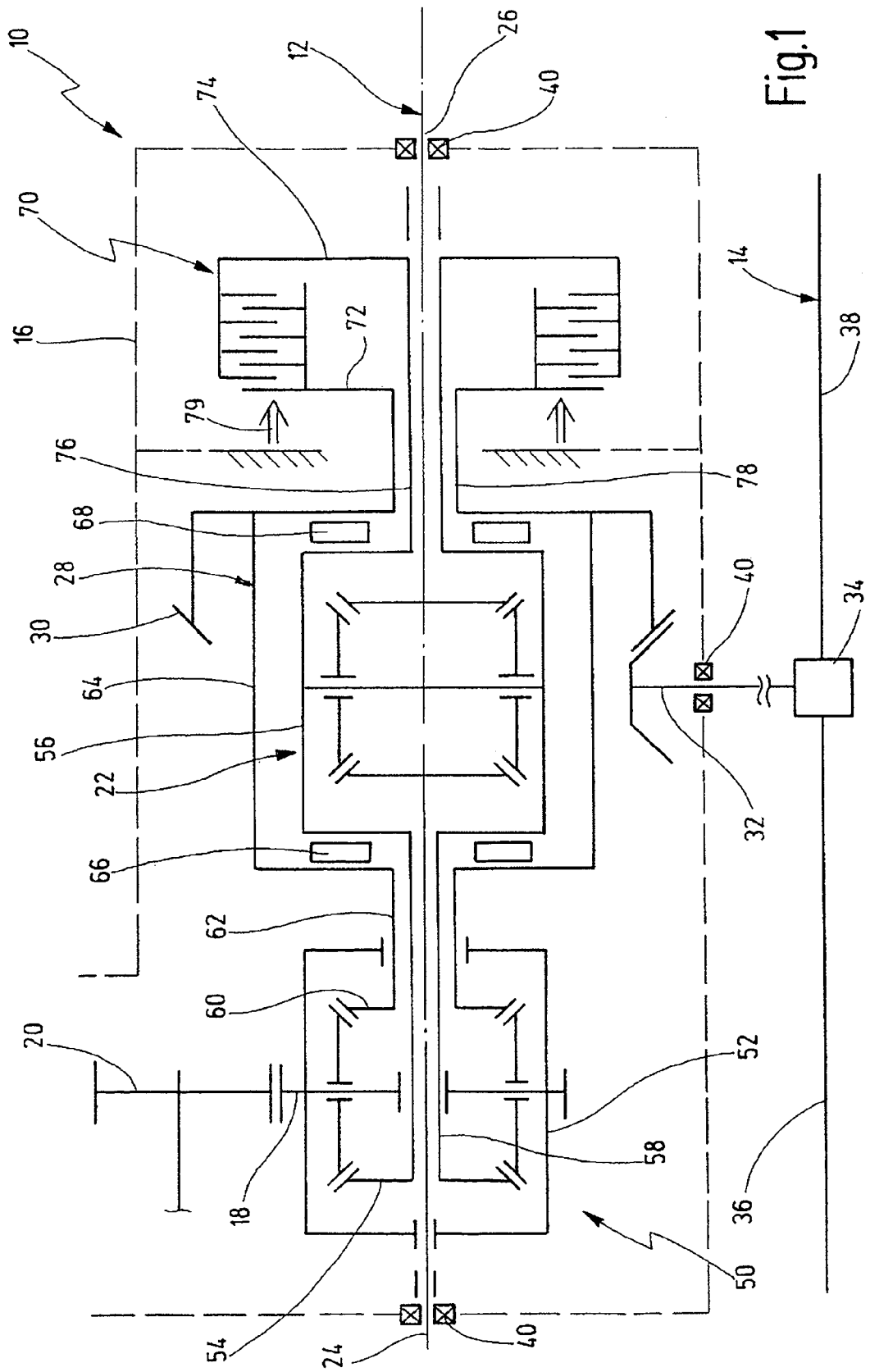
FIG. 1 shows a diagrammatic illustration of a power divider according to the present invention.

In FIG. 1, a first embodiment of the power divider according to the invention is designated in general by 10.

The power divider 10 serves for distributing the drive power or the driving torque of a drive unit of a motor vehicle to two driven axles, to be precise a front axle 12 and a rear axle 12 of the motor vehicle.

The power divider 10 has a diagrammatically illustrated casing 16 and an input member 18.

The input member 18 in the form of a driving gearwheel is in engagement with a drive wheel 20 of a drive unit of the motor vehicle.

The drive wheel 20 may be, for example, the final drive of a motor-step transmission or of a continuously variable transmission of the drive unit of the motor vehicle.

The input member 18 is provided coaxially with respect to the front axle 12.

Furthermore, a front axle differential 22 of a bevel wheel type of construction is arranged in the casing 16 of the power divider 10. The output elements, not designated in any more detail, of the front axle differential 22 are connected respectively to a first drive shaft 24 and a second drive shaft 26 of the front axle 12.

Furthermore, the power divider 10 has an output member 28. The output member 28 contains a crown wheel 30 which is in engagement with a bevel wheel of a cardan shaft 32. The cardan shaft 32 is connected to an input element of a rear axle differential 34. The output elements of the rear axle differential 34 are connected to a first rear axle drive shaft 36 and a second rear axle drive shaft 38.

At 40, shaft seals are illustrated in diagrammatic form, at which the first front axle drive shaft 24, the second front axle drive shaft 26 and the cardan shaft 32 emerge from the casing 16 of the power divider 10.

A longitudinal differential 50 in a bevel wheel type of construction is shown at 50. The longitudinal differential 50 distributes the torque coming from the drive unit to the front axle 12 and the rear axle 14 in a ratio of 50%:50%.

The longitudinal differential 50 has a differential cage 52. The input member 18 in the form of a spur wheel is connected to the differential cage 52.

The longitudinal differential 50 has a first output element 54 which is connected to a differential cage 56 of the front axle differential 22 via a first hollow shaft 58. The first hollow shaft 58 in this case surrounds the first front axle drive shaft 24.

The second output element 60 of the longitudinal differential 50 is connected to the output member 28 via a second hollow shaft 62. More precisely, the second hollow shaft 62 is connected to a crown wheel casing 64 which encloses the differential cage 56 of the front axle differential 22 axially on both sides. The crown wheel 30 is provided on the crown wheel casing 64 on that side of the front axle differential 22 which lies opposite the longitudinal differential 50.

A first axial bearing 66 and a second axial bearing 68 are arranged between the differential cage 56 and the crown wheel casing 64. Axial forces which are introduced into the differential cage 56 can thus be supported on the crown wheel casing 64.

The crown wheel casing 64 itself may be secured axially to the casing 16 by suitable bearings (for example, angularly set rolling bearings).

Furthermore, the power divider 10 has a first regulatable friction clutch 70 in the form of a lamellar clutch. Alternatively, however, the friction clutch 70 may also be implemented by another friction clutch concept, for example by conical friction surfaces.

The friction clutch 70 has a first friction member 72 which is designed as an inner lamella carrier. Furthermore, the friction clutch 70 has a second friction member 74 which is designed as an outer lamella carrier.

The second friction member 74 is connected via a third hollow shaft 76 to the differential cage 56 of the front axle differential 22. The first friction member 72 is connected to the crown wheel casing 64 via a fourth hollow shaft 78. The fourth hollow shaft 78 surrounds the third hollow shaft 76 in the same way as the second hollow shaft 62 surrounds the first hollow shaft 58.

At 79, a force is shown, which can be exerted on the lamellar clutch 70 by means of a piston/cylinder arrangement, not illustrated in any more detail in FIG. 1, and which is supported in the axial direction on a diagrammatically illustrated portion of the casing 16.

The second friction member 74 is connected axially rigidly to the differential cage 56. The reaction forces of the friction clutch 70 are consequently introduced into the differential cage 56 via the third hollow shaft 76. These forces can be introduced via the axial bearings 66, 68 into the crown wheel casing 64 and, via this, into the casing 16.

For this purpose, the first and the second axial bearing 66, 68 may be designed, for example, as needle bearings.

The load on the first and the second axial bearing 66, 68 is also comparatively low, since these are subjected to only static load when the front axle 12 and the rear axle 14 run at the same rotational speed.

The second friction member 74 is not supported on a bearing by means of which the second front axle drive shaft 26 is mounted on the output side.

As stated, the friction clutch 70 forms a longitudinal lock. Such a longitudinal lock makes it possible to transfer the torque in each case to the axle having the higher coefficient of friction. In this case, an active longitudinal lock, such as the regulated friction clutch 70, is advantageous, as compared with passive locks (for example, visco-locks or torque sense differentials), since, in particular, compatibility with ABS and ESP is ensured. This is because a passive lock cannot be switched off, whereas the regulated friction clutch 70 can be opened completely or virtually completely. Nevertheless, for example for reasons of cost, a passive visco-lock may also be used as a friction clutch instead of the regulated lamellar clutch 70.

The bevel wheel differential 22 for the front axle 12 may also be replaced by a passive locking differential, such as, for example, a torque sense differential.

Figure 2:
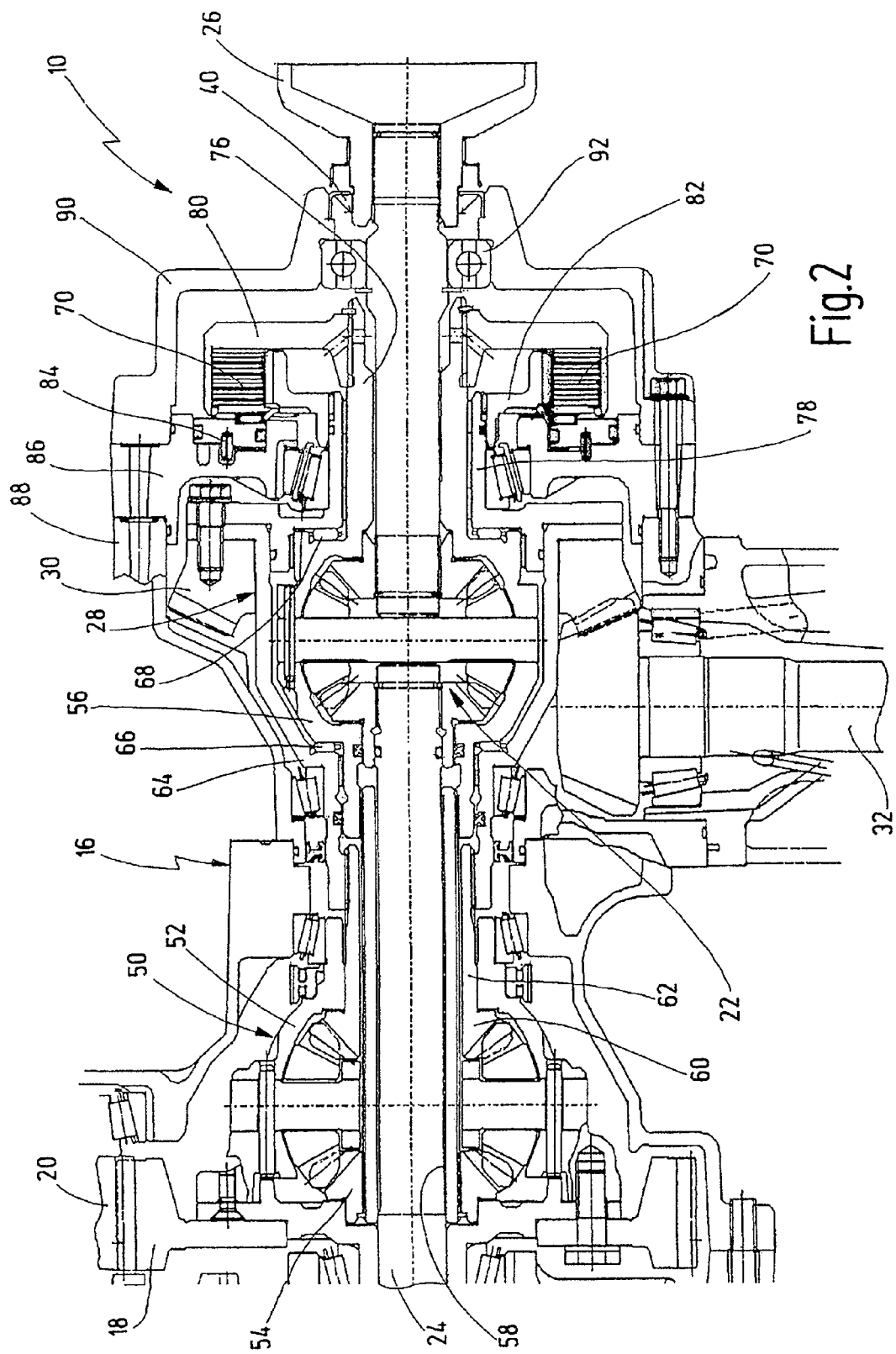
FIG. 2 shows a sectional view through a power divider according to the present invention, the functioning of which corresponds to the transmission diagram of FIG. 1.

FIG. 2 shows an axial sectional view of an implementation of the power divider concept illustrated diagrammatically in FIG. 1.

Identical components, subassemblies, etc., to those in FIG. 1 are identified by the same reference numerals. General functioning is identical to the functioning described with regard to the transmission diagram of FIG. 1. Reference is made expressly to the illustration of the features and functioning of the power divider of FIG. 1 in order to avoid repetition. Only a few structural details, which cannot readily be seen in FIG. 1, are dealt with below.

Thus, a radial first web 80 which forms the second friction member 74 is fastened rigidly to the axial end of the third hollow shaft 76. The web 80 is an outer lamella carrier of the first friction clutch 70.

At 82, the assigned inner lamella carrier is illustrated, which is mounted axially displaceably on the fourth hollow shaft 78.

The friction clutch 70 is acted upon axially by a piston of a piston/cylinder arrangement 84. The piston/cylinder arrangement can be controlled or regulated by means of an overriding control, such as is known per se in the prior art.

The piston/cylinder arrangement 84 is secured to a cylinder carrier 86. The cylinder carrier 86 is secured between a basic casing 88 of the power divider casing 16 and an axial cover 90 of the power divider casing 16.

It can easily be seen that the friction clutch 70 may even be omitted (for example, for reasons of cost). In this case, it would be simple, instead of the cylinder carrier 86, to insert a casing ring between the basic casing 88 and axial cover 90, and the third and the fourth hollow shaft 76, 78 would have no lamella carriers 80, 82 at their ends. Alternatively, a prolonged axial cover 90 may also be used.

Insofar as no friction clutch 70 is provided, the longitudinal differential 50 is an open differential. This has the disadvantage that the traction force is determined by the axle having the lowest coefficient of friction. Nevertheless, such a solution may be advantageous for reasons of cost.

Furthermore, FIG. 2 illustrates a shaft bearing 92 which mounts the second front axle drive shaft 26 on the power divider casing 16. The shaft bearing 92 is designed as a straightforward radial bearing. It does not absorb any forces from the web 80 in the axial direction.

The power divider illustrated in FIG. 2 is designed as a modular power divider. As already mentioned, it may be provided with or without a longitudinal lock in the form of the first friction clutch 70.

The regulated lamellar clutch 70 may be replaced, for example, by a passive visco-lock.

Figure 3:
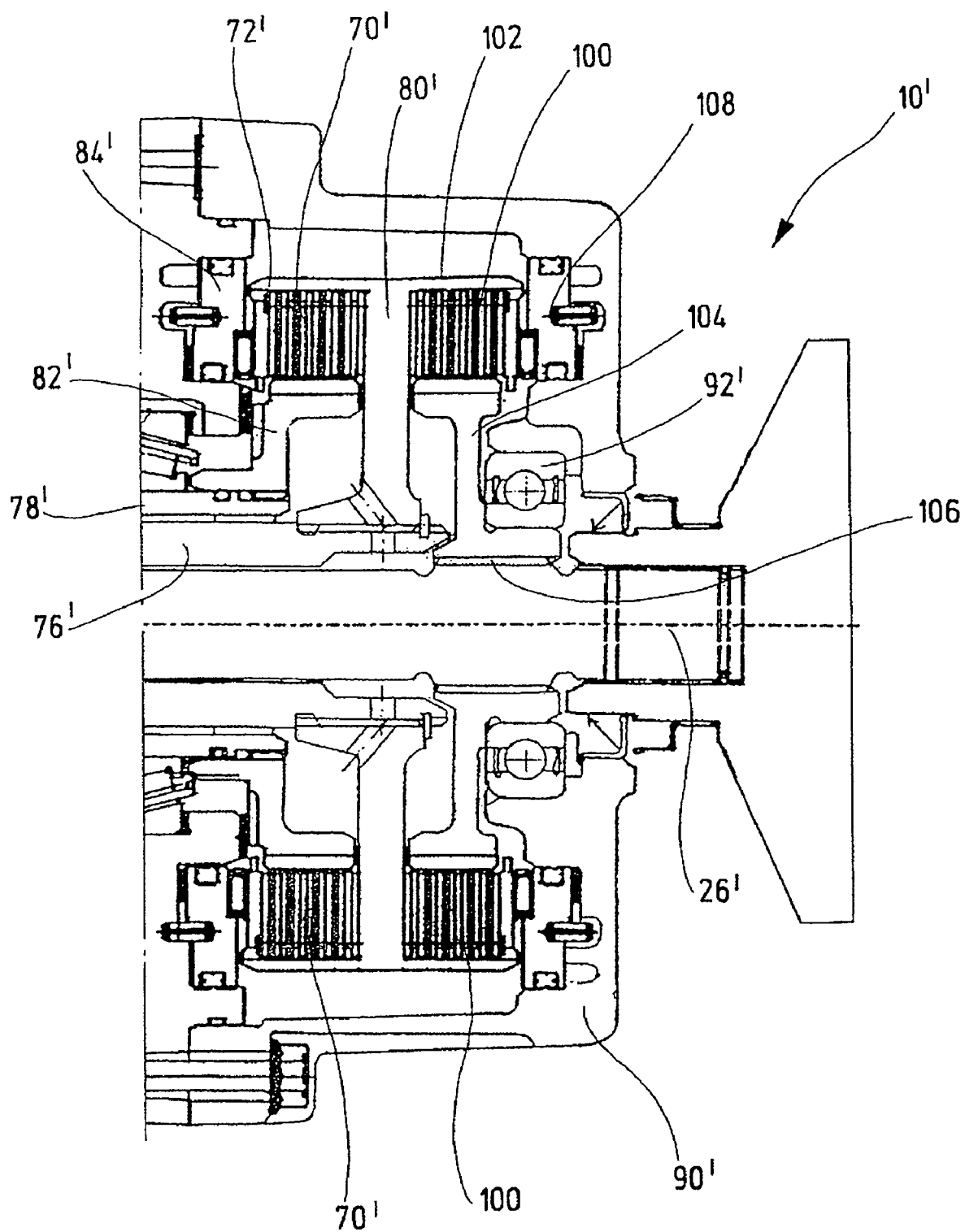
FIG. 3 shows an axial end portion of an alternative embodiment of the power divider according to the invention.

In FIG. 3, a further alternative embodiment of the power divider according to the invention is designated in general by 10'.

The power divider 10' corresponds in it basic construction and in its basic functioning to the power divider 10 of FIGS. 1 and 2. Reference is therefore made in full to the description of these. Only the differences are dealt with below.

The power divider 10' has, in addition to the friction clutch 70' which is designed as a longitudinal lock between the front axle 12 and rear axle 14, a transverse lock in the form of a second friction clutch 100.

A radially extending web 80' is secured rigidly to the third hollow shaft 76' which is connected to the differential cage 56 for the front axle differential 22.

As in the embodiment of FIG. 2, an outer lamella carrier which extends toward the front axle differential 22 is mounted on the web 80'. The outer lamella carrier of the first friction clutch 70' consequently forms a first friction member 72'.

An inner lamella carrier 82' for the first friction clutch 70' is mounted on the fourth hollow shaft 78', as in the power divider 10 of FIG. 2.

The functioning of the friction clutch 70' and the general construction correspond to the functioning and construction of the friction clutch 70 of FIG. 2.

A further outer lamella carrier 102 is secured to the web 80'. The outer lamella carrier 102 extends in the opposite direction, that is to say toward the axial end of the power divider 10' or toward the axial cover 90'.

Furthermore, an inner lamella carrier 104 of the second friction clutch 100 is connected fixedly in terms of rotation to the second front axle drive shaft 26', specifically via a toothed profile 106.

The second front axle drive shaft 26' is mounted on the axial cover 90 via a shaft bearing 92', the inner ring of which is connected to an axial projection of the inner lamella carrier 104 of the second friction clutch 100.

Furthermore, a second piston/cylinder arrangement 108 which serves for acting upon the second friction clutch 100 is integrated in the axial cover 90'.

As stated, the second friction clutch 100 is designed as a transverse lock for the front axle differential 22. Insofar as slip occurs on one of the two driven wheels of the front axle 12, this is detected by an overriding control, and the second friction clutch 100 is closed. The front axle differential 22 is thereby locked, and a higher torque can thus be transferred to the front wheel having the higher coefficient of friction.

It would be appreciated that the friction clutches 70 or 70', 100 are preferably designed as regulated friction clutches which can not only be opened and closed, but also be operated in a slipping state. This affords the highest possible variability in torque distribution to the four driven wheels of the motor vehicle.

It can be seen from a comparison of FIGS. 2 and 3 that the additional transverse lock in the form of the second friction clutch 100 can be provided in a simple way by modular extension to the power divider 10 of FIG. 2. For this purpose, it is necessary merely to exchange the web 80 for the web 80' in order to allow a back-to-back arrangement of the two friction clutches 70', 100. Furthermore, the inner lamella carrier 104 is to be secured to the second front axle drive shaft 26', and a changed axial cover 90' is to be provided, which receives not only the first friction clutch 70, but also the second friction clutch 100 and, in addition to this, the piston/cylinder arrangement 108 for actuating the second friction clutch 100. Furthermore, a changed shaft bearing 92' is to be provided, which also makes it possible to introduce axial forces into the axial cover 90'.

The transverse lock in the form of the second friction clutch 100 can consequently be implemented cost-effectively as an additional option in the power divider 10 of FIGS. 1 and 2.

Figure 4:
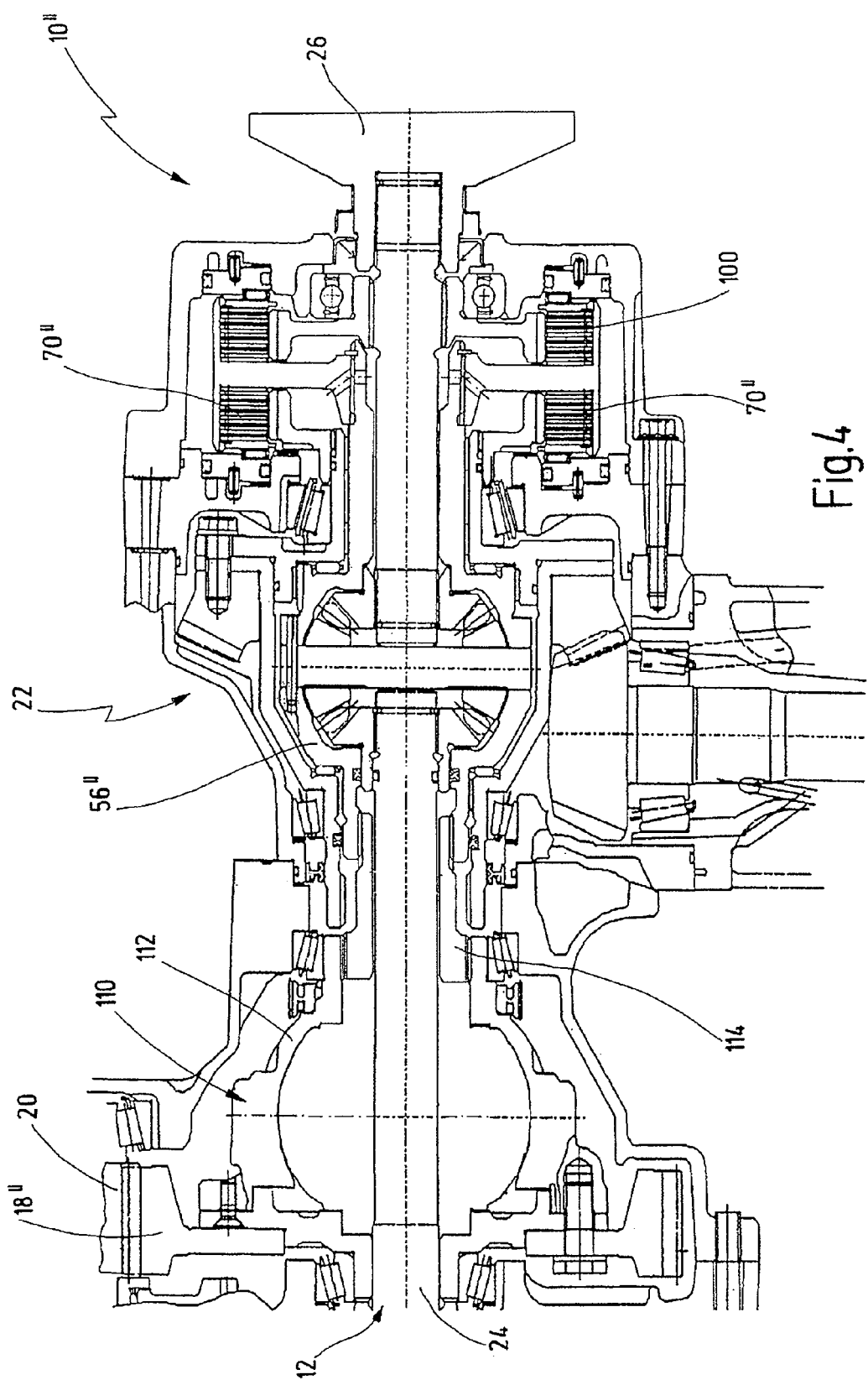
FIG. 4 shows a view, corresponding to FIG. 2, of a further embodiment of the power divider according to the invention.

In FIG. 4, a further embodiment of the power divider according to the invention is designated in general by 10".

The power divider 10" is based in terms of construction and functioning on the power divider 10 of FIG. 2. Reference is therefore made in full to the description of this. Only the differences are explained below.

Whereas the power divider 10 of FIG. 2 is a differential-controlled system with regard to torque distribution between the axles, a clutch-controlled variant is implemented in the power divider 10".

In the power divider 10 of FIG. 2, a longitudinal differential 50 is provided for torque distribution in the ratio 50%:50%.

By contrast, in the power divider 10", only the front axle 12 is driven permanently. The rear axle 14 (not illustrated in FIG. 4) is merely cut in as required (in the event of slip on the front axle), specifically via the friction clutch 70".

No longitudinal differential 50 is provided in the power divider 10". Instead, a connecting member 110 is provided, which connects the input member 18" of the power divider 10" to the input element (the differential cage 56") of the front axle differential 22.

The connecting member 110 has a cage member 112 which replaces the differential cage 52 of the longitudinal differential 50 and which is hollow on the inside. Furthermore, the connecting member 110 has a hollow-shaft member 114 which connects the cage member 112 to the differential cage 56" of the front axle differential 22.

Consequently, in the power divider 10", the drive power introduced via the input member 18" is first conducted directly to the front axle differential 22. The front axle differential 22 distributes the drive power to the two front axle drive shafts 24, 26.

In the event that slip occurs on the front axle 12, the friction clutch 70" is actuated in the manner of a hang-on solution. In this case, the front axle 12 and rear axle 14 are locked with respect to one another, so that traction is determined by the axle having the higher coefficient of friction.

The regulated friction clutch 70" may also be replaced by a passive friction clutch, for example by a visco-clutch.

Furthermore, the power divider 10" has a transverse lock for the front axle in the form of the second friction clutch 100. However, in the power divider 10", the friction clutch 100 may even be omitted, in a similar way to the power divider 10 of FIG. 2. In this case, the front axle differential 22 would be an open differential, and the rear axle would be cut in, only as required, via the friction clutch 70".

It can be seen, furthermore, in FIG. 4 that the power divider 10" can be implemented in a structurally simple way, based on the basic concept of the power divider 10 of FIG. 2.

It would be appreciated that a clutch-controlled concept of torque distribution according to the power divider 10" is generally inferior to the differential-controlled torque distribution according to the power divider 10 of FIG. 2. Such a solution may nonetheless be relevant for reasons of cost.

On account of the modular type of construction of the power divider, the latter can be adapted to the respective application in an optimal and cost-saving way.

The power dividers of FIGS. 1 to 4 are in each case arranged coaxially with respect to the front axle of the motor vehicle and, as a rule, are flanged directly to a casing of a drive unit (casing of, for example, a motor-step transmission) which is likewise installed at the front.

It will be appreciated, however, that the power dividers of FIGS. 1 to 4 may be used in the same way in a rear axle, in which case the drive unit is likewise arranged, as a rule, at the rear of the vehicle. The axle 12 is then the rear axle and the axle 14 the front axle.

The invention claimed is:

1. A power divider for a motor vehicle with a first and a second driven axle, with an input member which is connectable to the output of a drive unit, with a transverse differential for the first driven axle and an output member which is connectable to the second driven axle, and with a friction clutch which has two friction members, one of the friction members being connected to the output member, the other friction member being connected axially rigidly to an input element of the transverse differential, and the input element of the transverse differential being supported in the axial direction on the output member.

2. The power divider of claim 1, with a space for a longitudinal differential being provided coaxially with respect to the first driven axle, so that, alternatively,
a longitudinal differential can be installed, the input element of which is connected to the input member and which is connected on the output side to the input element of the transverse differential and to the output member, the friction clutch serving as a longitudinal lock,
or
the input member is connected to the input element of the transverse differential by means of a connecting member bridging the longitudinal differential space, the friction clutch serving for cutting in the second driven axle.

3. The power divider as claimed in claim 1, with a second friction clutch which serves as a transverse lock.

4. The power divider as claimed in claim 3, one friction member of the second friction clutch being connected to the input element of the transverse differential, and another friction member of the second friction clutch being connected to one of the two output elements of the transverse differential.

5. The power divider as claimed in claim 3, the first and the second friction clutch sharing a web on which a friction member of the first friction clutch and a friction member of the second friction clutch are mounted.

6. The power divider as claimed in claim 5, the friction members mounted on the web being mounted on opposite axial sides of the web.

7. The power divider as claimed in claim 1, the first friction clutch and, if appropriate, the second friction clutch being arranged at one axial end of the power divider.

8. The power divider as claimed in claim 1, a casing of the power divider having an axial cover which receives the first friction clutch and, if appropriate, the second friction clutch.

9. The power divider as claimed in claim 8, an actuating member for actuating the second friction clutch being integrated in the axial cover.

10. The power divider as claimed in claim 1, the transverse differential being a bevel wheel differential.

11. The power divider as claimed in claim 2, the longitudinal differential being a bevel wheel differential.

12. A modular power divider for a motor vehicle with a first and a second driven axle, with an input member which is connectable to the output of a drive unit, with a transverse differential for the first driven axle and an output member which is connectable to the second driven axle, and with a friction clutch which has two friction members, one of the friction members being connected to the output member, the other friction member being connected to an input element of the transverse differential, and, furthermore, a space for a longitudinal differential being provided coaxially with respect to the first driven axle, so that, alternatively,
a longitudinal differential can be installed, the input element of which is connected to the input member and which is connected on the output side to the input element of the transverse differential and to the output member, the friction clutch serving as a longitudinal lock,
or
the input member is connected to the input element of the transverse differential by means of a connecting member bridging the longitudinal differential space, the friction clutch serving for cutting in the second driven axle.

13. The power divider as claimed in claim 12, with a second friction clutch which serves as a transverse lock.

14. The power divider as claimed in claim 13, one friction member of the second friction clutch being connected to the input element of the transverse differential, and another friction member of the second friction clutch being connected to one of the two output elements of the transverse differential.

15. The power divider as claimed in claim 13, the first and the second friction clutch sharing a web on which a friction member of the first friction clutch and a friction member of the second friction clutch are mounted.

16. The power divider as claimed in claim 15, the friction members mounted on the web being mounted on opposite axial sides of the web.

17. The power divider as claimed in claim 12, the first friction clutch and, if appropriate, the second friction clutch being arranged at one axial end of the power divider.

18. The power divider as claimed in claim 12, a casing of the power divider having an axial cover which receives the first friction clutch and, if appropriate, the second friction clutch.

19. The power divider as claimed in claim 18, an actuating member for actuating the second friction clutch being integrated in the axial cover.

20. A power divider for a motor vehicle with a first and a second driven axle, with an input member which is connectable to the output of a drive unit, with a transverse differential for the first driven axle and an output member which is connectable to the second driven axle, and with a friction clutch which has two friction members, one of the friction members being connected to the output member, the other friction member being connected axially rigidly to an input element of the transverse differential, and with an actuator arrangement that acts axially upon the friction clutch, and the input element of the transverse differential being supported in the axial direction on the output member.

21. The power divider of claim 20, the output member being supported in the axial direction on a casing of the power divider.

* * * * *